Patented Jan. 17, 1950

2,494,859

UNITED STATES PATENT OFFICE 2,494,859

PREPARATION OF METHACROLEIN OXIME

Darrel J. Butterbaugh, Abington, and Newman M. Bortnick, Philadelphia, Pa., assignors to Rohm & Haas Company, Philadelphia, Pa., a corporation of Delaware No Drawing. Application December 18, 1947, Serial No. 792,596

5 Claims. (Cl. 260—566)

This invention relates to a method of producing methacrolein oxime.

Methacrolein oxime is of interest as a material from which many other chemical compounds can be derived. It has also been proposed as an antiskinning agent in paints, varnishes, and enamels.

Methacrolein oxime may be prepared by heating a tertiary α-aminoisobutyraldoxime or an acid salt thereof between 120° C. and about 250° C., preferably under reduced pressure, thus splitting the amino oximes into methacrolein oxime and a secondary amine or amine salt, and by separating the products. The best range of pyrolysis is between 135° C. and 175° C. The rate of reaction is somewhat slow below 135° C., but the reaction is otherwise satisfactory. Above 175° C., there is a tendency for undesired products to be formed, while above 200° a dehydration reaction may begin.

The tertiary α-aminoisobutyraldoximes are prepared by reacting together a secondary monoamine and the dimeric addition product from equimolecular proportions of isobutene, 2-methylpropene, and nitrosyl chloride. This dimeric product is formed on mixing the two reactants at temperatures below 30° C. The addition reaction is desirably carried out in an inert organic solvent such as a petroleum naphtha, chloroform, or chlorobenzene. The dimer separates as a white solid.

The reaction of the dimeric addition product and a secondary amine is performed between 0° and 90° C. upon mixing of the said product and amine. This reaction is preferably performed in the presence of a volatile inert organic solvent which permits control of temperature and aids in removal of hydrogen chloride from the amine salts which are formed in the reaction. As solvents, there may be used benzene, toluene, petroleum ether, methanol, acetone, or the like. When excess dimethylamine or diethylamine is used, there separates an amine hydrochloride which can be filtered from the reaction mixture. The tertiary α-aminoisobutyraldoximes may also be purified by washing with water or a dilute alkali solution. In this way, there may be obtained such amino oximes as 2-N-dimethylaminoisobutyraldoxime, 2 - N - diethylaminoisobutyraldoxime, 2 - N - dibutylaminoisobutyraldoxime, 2-N-diamylaminoisobutyraldoxime, 2-N-dioctylaminoisobutyraldoxime, 2-N-methyl - N-octylaminoisobutyraldoxime, α - piperidinoisobutyraldoxime, α - pyrrolidinoisobutyraldoxime, α-morpholinoisobutyraldoxime, 2 - N - dicyclohexylaminoisobutyraldoxime, 2-N-diallylaminoisobutyraldoxime, 2 - N-benzyl-N-methylaminoisobutyraldoxime, and 2-N-dodecyl-N-methylaminoisobutyraldoxime. The preparation is further described in application Serial No. 792,597, filed on even date. The 2-N-alkylaminoisobutyraldoximes form a class of particular interest.

When a tertiary α-aminoisobutyraldoxime is heated above 120° C., it begins to decompose. In place of the free amine, there may be used an amine salt, such as a hydrochloride, hydrobromide, toluene sulfonate, phosphate, acetate, or the like. Under reduced pressure, the products formed by heating are taken off, and the pressure is adjusted to permit taking off product at the temperature of pyrolysis. It is desirable to remove methacrolein oxime as rapidly as it is formed. This can be accomplished by heating the α-aminoisobutyraldoxime or its salt in a still connected with a packed fractionating column by which unchanged amino oxime is separated and returned by reflux. There passes over methacrolein oxime and an amine when a volatile amine results from the pyrolysis. Usually, the best separation is had by fractional distillation under reduced pressure. The more volatile amines, such as dimethylamine and diethylamine, are readily stripped off during practically complete reflux of the methacrolein oxime. This may then be collected as a distilled fraction with only traces of amines. A typical satisfactory set of conditions for collection of methacrolein oxime has been found to be 51°–53° C. at 15 mm. pressure. Any small amount of amine remaining in this oxime may be separated by use of an acid. Oxalic acid and acetic acid have been found satisfactory among others.

During the thermal decomposition of some tertiary α-aminoisobutyraldoximes, there accumulates a residue which may decompose rather rapidly if heated above 175° C. The addition of one-half to two per cent. of hydroquinone or β-naphthol, however, stabilizes the residue sufficiently to permit heating from 200° C. to 250° C., without vigorous decomposition resulting. Various other substances have been added to decrease the amount of residue. The most effective of these was activated charcoal.

The following examples present further details of typical preparations of methacrolein oxime.

Example 1

There was charged to a small still equipped with a column packed with glass helices two hundred grams of N-dimethylaminoisobutyraldoxime. The still was heated, and the pressure therein was reduced to 135 mm. When the pot temperature was 135° C., the formation of methacrolein oxime proceeded rapidly. The vapor temperature was 86° C. A moderate amount of reflux was maintained in the above column. The volatilized products were condensed and dedistilled at 100 mm. pressure, where most of the dimethylamine was removed. The pressure was then decreased to 15 mm. and the methacrolein oxime distilled at 51°–53° C. A few oxalic acid crystals were added to the distillate. This formed an amine salt which was filtered off after the distillate had been chilled to 5° C. The yield of methacrolein oxime was 78%.

Example 2

The procedure of Example 1 was repeated except that the decomposition of dimethylaminoisobutyraldoxime was effected at 140°–145° C. at 137 mm. pressure with minimum reflux. The yield was 80%.

Example 3

The pyrolysis of dimethylaminoisobutyraldoxime was performed in the same apparatus under moderate reflux at 25 mm. pressure and 121°–124° C. The yield of purified product was 80%.

Example 4

The above procedures were followed again, but 1% of hydroquinone was added to the charge. The pyrolysis was performed at 300 mm. pressure and 148°–152° C. The yield was 84%.

Example 5

The above procedure was followed with the use of 1% of hydroquinone based on the charge of two hundred grams of dimethylaminoisobutyraldoxime. There was also added five grams of activated charcoal. The pyrolysis was effected at 137°–140° C. under 137 mm. pressure. The first distillate was fractionated as in Example 1 and a second distillate obtained containing 0.5% of dimethylamine. This was treated with a gram of powdered oxalic acid and filtered to give practically pure methacrolein oxime in a yield of 86%.

Example 6

A charge of one hundred grams of diamylaminoisobutyraldoxime was placed in the still. The pressure was reduced to 140 mm., and the charge was heated to 130° C. The fractionating column was operated at a high reflux ratio. The distillate obtained was practically pure methacrolein oxime in a yield of 39%.

Example 7

The procedure of Example 6 was followed with substitution of di-2-ethylhexylaminoisobutyraldoxime. A yield of 44% of methacrolein oxime was obtained.

Example 8

Ten grams of α-dimethylaminoisobutyraldoxime was heated in a flask at atmospheric pressure. Decomposition began below 170° C. and was complete below 200° C. There was considerable tendency for the starting material to sublime onto the cooler parts of the distillation assembly. In order to decompose the last traces of material, the flask was heated to 250° C. The distillate weighed 9.5 grams and did not contain any solid matter, although redistillation gave some dimethylamine in the foreruns. Four grams (60% yield) of methacrolein oxime was obtained having the proper physical constants. Two grams of polymerized material remained in the pot.

In like manner, α-piperidinoisobutyraldoxime was converted to piperidine and methacrolein oxime. Other alpha heterocyclic aminoisobutyraldoximes heated as above or under reduced pressure yield methacrolein oxime in the same way.

In place of the α-aminoisobutyraldoximes, there may be used the acid salts of these compounds. Normal or reduced pressure may be employed while these salts are heated with formation of methacrolein oxime. The crude product is generally readily purified on redistillation.

Example 9

Ten grams of α-piperidinoisobutyraldoxime hydrochloride was placed in a 50 cc. Claisen flask fitted with thermometers in the pot and in the sidearm. The flask was heated with a flame, and 3.3 grams of a straw-yellow distillate, boiling at 100°–148° C., was obtained. The pot temperature was kept below 200° C. until the end of the distillation, when it rose to 240° C. The distillate contained a trace of water. Redistillation gave 2.4 grams of pure methacrolein oxime, which boiled at 143°–148° C. and had a refractive index, $n_D^{20}$, of 1.4789.

Example 10

Ten grams of α-dimethylaminoisobutyraldoxime hydrochloride was pyrolyzed as in Example 9. The distillate weighed 4.8 grams. The pot temperature remained at 180°–200° C. during the major part of the operation. Refractionation gave a 75% yield of methacrolein oxime having the proper physical constants.

The process here shown involves the decomposition at 120° to 200° C. of tertiary α-aminoisobutyraldoximes,

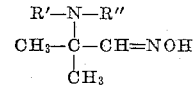

wherein R' and R'' represent individually hydrocarbon groups and represent jointly a divalent hydrocarbon or ether chain which, together with the nitrogen, forms a heterocycle. Suitable divalent groups are $-CH_2CH_2CH_2CH_2-$, $-CH_2CH_2CH_2CH_2CH_2-$, and $-CH_2CH_2OCH_2CH_2-$, as obtained from pyrrolidine, piperidine, and morpholine, respectively. The α-aminoisobutyraldoximes in which the amine group carries a saturated divalent chain forming a heterocycle with the nitrogen thereof compose one interesting group of starting materials. Another group is made up of α-aminoisobutyraldoximes in which the amino substituents are alkyl groups, particularly those of one to eight carbon atoms.

We claim:

1. A method for preparing methacrolein oxime which comprises decomposing a 2-N-dialkylaminoisobutyraldoxime by heating it between 120° C. and 250° C. and separating methacrolein oxime from the decomposition products thereof.

2. A method for preparing methacrolein oxime which comprises decomposing a 2-N-dialkylaminoisobutyraldoxime, the N-alkyl groups of which contain one to eight carbon atoms, by heating said 2-N-dialkylaminoisobutyraldoxime between 120° C. and 200° C. under reduced pressure and separating methacrolein oxime from the decomposition products thereof.

3. A method for preparing methacrolein oxime which comprises decomposing 2-dimethylaminoisobutyraldoxime by heating said compound between 120° C. and 175° C. under less than atmospheric pressure and separating methacrolein oxime from the resulting decomposition products.

4. A method for preparing methacrolein oxime which comprises decomposing a 2-N-dialkylaminoisobutyraldoxime, the N-alkyl groups of which contain one to eight carbon atoms, by heating said 2-N-dialkylaminoisobutyraldoxime between 120° C. and 200° C. in the presence of hydroquinone and separating methacrolein oxime.

5. A method for preparing methacrolein oxime which comprises decomposing diamylaminoisobutyraldoxime by heating said oxime between 120° C. and 175° C. under reduced pressure and separating methacrolein oxime from the resulting decomposition products.

DARREL J. BUTTERBAUGH.
NEWMAN M. BORTNICK.

REFERENCES CITED

The following references are of record in the file of this patent:

UNITED STATES PATENTS

| Number | Name | Date |
|---|---|---|
| 2,394,430 | Crowder et al. | Feb. 5, 1946 |

OTHER REFERENCES

Tilden et al.: "J. Chem. Soc." (London), vol. 65 (1895), pp. 324, 325, 326 and 333.

Drew et al.: "J. Chem. Soc." (London), 1934, pp. 49–50.

Ellis: "The Chemistry of Petroleum Derivatives" (1934), pp. 579–580.